Jan. 5, 1971  W. E. SPARKS  3,552,879

BEATER STORAGE FOR HAND MIXER

Filed Feb. 28, 1969

WITNESSES:
Leon M. Garman
James T. Young

INVENTOR
Walton E. Sparks
BY
AGENT

United States Patent Office 3,552,879
Patented Jan. 5, 1971

3,552,879
BEATER STORAGE FOR HAND MIXER
Walton E. Sparks, Lexington, Ohio, assignor to Westinghouse Electric Corporation, Pittsburgh, Pa., a corporation of Pennsylvania
Filed Feb. 28, 1969, Ser. No. 803,229
Int. Cl. A47j 43/04
U.S. Cl. 416—63                                    5 Claims

ABSTRACT OF THE DISCLOSURE

Hand-held food mixer characterized by the incorporation of means for removably attaching the beater structure of the housing thereof, for storage purposes.

BACKGROUND OF THE INVENTION

This invention relates, in general, to hand-held food mixers and, more particularly, to beater storage means associated therewith.

The utility of portable or hand-held mixers is well recognized, however, their actual use is somewhat dependent upon the ease with which such an implement can be stored. Heretofore, storage racks or cases may have been provided wherein the mixer as well as the beaters are placed for storage. These racks can be mounted on a wall or placed in a drawer or cupboard in accordance with the desire of the user.

While the foregoing should preclude any and all problems, most often the mixer and the beater are simply placed in a drawer or in separate drawers, the latter of which is often placed in the silverware drawer. Such an arrangement leads to the inconvenience of searching for one or the other, usually the beaters, with the results some times being unsatisfactory.

Accordingly, the general object of this invention is to provide a new and improved hand-held or portable mixer.

It is a more particular object of this invention to provide a new and improved portable mixer which incorporates structure for attaching the beaters to the mixer housing in such a manner as to facilitate storage of the beaters together with the mixer.

BRIEF SUMMARY OF THE INVENTION

Briefly, the above-cited objects are accomplished by the provision of a beater ejector structure located in the bottom wall at the front of the mixer. The ejector mechanism is provided with transverse or sidewardly projecting members which are parallel to and spaced from the bottom wall such that spaces are provided therebetween on each side of the ejector. One end of the shaft of the beater is captivated in the aforementioned spaces when the annular shoulder carried by the beater shaft is received in a slot in the bottom wall at a point remote from the ejector. The walls or edges defining the slot retain the shoulders in a somewhat fixed position and together with a resilient member that mounts the ejector mechanism serve to retain the beaters, the resilient member providing a component of force in the direction of the housing.

Further objects and advantages of the present invention will become apparent when considered in view of the description of the preferred embodiment of the invention and drawings forming a part hereof.

DESCRIPTION OF THE PREFERRED EMBODIMENT

Figure 1:
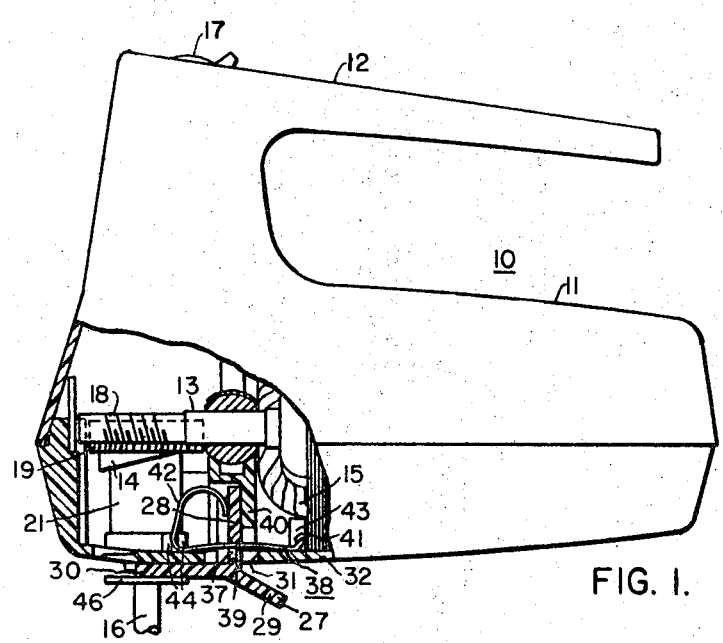
FIG. 1 is a side-elevational view, partly broken away, of a food mixer representing the present invention.

Referring to the drawings, especially FIG. 1, reference character 10 designates generally a food mixer comprising a two-piece housing 11 having a handle 12 formed integrally with the top member of the two-piece housing 11. The bottom member of the housing 11 supports a drive shaft 13 for a pair of hollow spindles 14, only one being shown, adapted to telescopically receive for rotation therewith, the shafts of a pair of beaters 16. The shaft 13 is driven by a suitable motor 15 contained in the lower member of the housing 11, which motor is adapted to be energized by means of a multi-position, manually operable switch 17. A worm or worm gear 18 formed in shaft 13 meshes with worm wheels 19 fixed to the upper ends of the spindles 14 which are supported for rotation by vertically disposed sleeve bearings 21.

Ejecting mechanism 27 comprises a one-piece lever member preferably molded from any suitable material, for example, nylon. The lever member 27 has a generally Y-shaped configuration consisting of three legs or radially extending arms 28, 29 and 30. The leg 28 is inserted through an opening 31 in a bottom wall 32 of the housing 11 and leg 28 is provided with an aperture 37 for receiving resilient means, herein disclosed as a spring 38.

The spring 38 comprises a substantially horizontal but slightly bowed portion 29, bifurcated at one end as indicated at 41, and a substantially vertical hook-shaped portion 42. The free end of the hook-shaped portion 42 biases the leg 28 in a clockwise direction, as viewed in FIG. 1, to oppose counterclockwise movement of the leg 29 which lies outside of the housing 11 and which in its inoperative position (as shown) forms an acute angle with respect to the bottom wall 32. Biasing of the leg 28 in the clockwise direction is limited by the abutment thereof against a partition 40 (see FIG. 1) extending between the side walls of the bottom member of the housing 11. The spring 38 serves to fix the vertical position of the lever member 27 in the opening 31 and the horizontal movement thereof is restrained through abutment of the bifurcated end 41 against a vertical post 43 and the hook-shaped portion 42 against a pair of vertical shoulders 44 (only one shown). To assemble the lever 27 and spring 38, the leg 28 of the spring is inserted through the opening 31, then the bifurcated end of the spring is inserted through the aperture 37 and snapped into place between the post 43 and shoulders 44 and lies across the opening 31. The leg 30 of the lever 27 is substantially parallel to and is disposed intermediate the bottom wall 32 and shoulders 46 formed integrally or otherwise provided in the upper portion of the shaft of the beaters 16 subadjacent the spring C rings 23. Since the leg 30 is integral with the leg 29, it moves in a counterclockwise direction upon depression toward the bottom wall 32 or actuation of the leg 29 to simultaneously contact the shoulders 46 thereby applying sufficient force to completely eject the beaters 16 from the spindles 14. Upon release of the leg 29 the hook-shaped portion 42 of the spring 38 returns the lever 27 to its rest or normal position. The leg 29 may be thought of as an actuating button which pivots about a horizontal axis through the line of conduit between the shoulders 36 and the trunnions 33. While the leg 29, as disclosed, simultaneously contacts both of the shoulders 46, it may be provided with a stepped area in its underside whereby the shoulders 46 are sequentially contacted thereby reducing the peak force required for ejection of the beaters.

Figure 2:
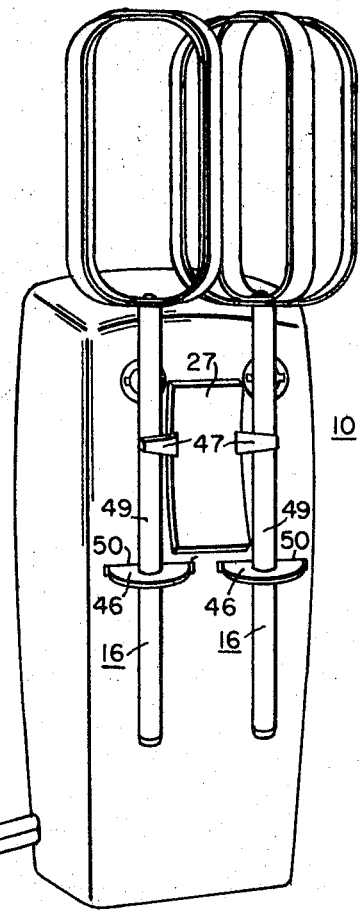
FIG. 2 is a bottom perspective view of the mixer illustrated in FIGURE 1.

As shown in FIG. 2, the ejecting lever 27 is provided with a pair of sidewardly or transversely projecting members 47 which are substantially parallel to and spaced from the bottom wall of the bottom housing member to provide spaces 48 for receiving shafts 49 of the beater structure 16. A pair of slots 50 in the bottom casing section are provided for receiving the shoulders 46 which cooperate with the projection members 47 and spring 48 to captivate the beater structure, as shown in FIG. 2. To this end it will be apparent that the spring 38 provides a component force normal to the bottom of the mixer housing.

Since numerous changes may be made in the above-described apparatus and different embodiments of the invention may be made without departing from the spirit thereof, it is intended that all matter contained in the foregoing description or shown in the accompanying drawings shall be interpreted as illustrative and not in a limiting sense.

I claim as my invention:

1. A hand mixer comprising:
   housing structure,
   drive means disposed within said housing,
   at least one beater structure operable by said drive means and operably connected thereto,
   means for disconnecting said beater structure from said drive means,
   means carried by said disconnecting means cooperating with means defined by said housing for storing said at least one beater structure.

2. Structure as specified in claim 1 wherein, said at least one beater structure comprises an elongated shaft having shoulder means thereon and said means defined by said housing comprises a slot for receiving said shoulder means.

3. Structure as specified in claim 2 wherein, said means carried by said disconnecting means comprises a transverse projection and walls defining said slot to prevent movment of said at least one beater structure so as to maintain the shaft of said at least one beater structure between said projection and said housing.

4. Food mixing apparatus comprising housing structure,
   means contained by said housing structure for providing power for operating beater structure,
   beater structure insertable into said means for providing power,
   means for disconnecting said beater structure after use of said apparatus,
   resilient means for mounting said disconnect means to said housing structure,
   means carried by said disconnect means cooperating with an adjacent area of said housing structure to provide at least one space for receiving a beater shaft,
   means remote from said space, cooperating with said housing structure and said means cooperating with an adjacent area of said housing structure to retain said beater structure to said housing structure for storage.

5. Structure as specified in claim 4 wherein, said means carried by said disconnect means comprises a transverse projecting member and said remote means comprises the edges defining an opening in said housing structure.

References Cited

FOREIGN PATENTS 1,248,592  11/1960  France _____ 416—63

EVERETTE A. POWELL, Jr., Primary Examiner

U.S. Cl. X.R.

416—76